United States Patent
Himes et al.

(10) Patent No.: US 6,967,821 B2
(45) Date of Patent: Nov. 22, 2005

(54) HEAD GIMBAL ASSEMBLY INCLUDING DAMPENING FOR AIR BEARING VIBRATION

(75) Inventors: Adam K. Himes, Richfield, MN (US); Jonathan C. Chaffee, St. Louis Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 269 days.

(21) Appl. No.: 10/191,521

(22) Filed: Jul. 9, 2002

(65) Prior Publication Data
US 2003/0011936 A1 Jan. 16, 2003

Related U.S. Application Data
(60) Provisional application No. 60/304,237, filed on Jul. 10, 2001.

(51) Int. Cl.[7] .............................. G11B 5/48; G11B 21/16
(52) U.S. Cl. ................... 360/245.3; 360/245.7
(58) Field of Search .................. 360/245.3, 245.4, 360/245.7, 245.8, 245.9

(56) References Cited

U.S. PATENT DOCUMENTS

| | | | |
|---|---|---|---|
| 4,870,519 A | 9/1989 | White | 360/103 |
| 4,991,045 A * | 2/1991 | Oberg | 360/244.3 |
| 5,128,821 A | 7/1992 | Takeuchi et al. | 360/103 |
| 5,187,625 A | 2/1993 | Blaeser et al. | 360/104 |
| 5,408,372 A | 4/1995 | Karam, II | 360/104 |
| 5,473,487 A * | 12/1995 | Nagase | 360/245.6 |
| 5,491,597 A | 2/1996 | Bennin et al. | 360/104 |
| 5,491,598 A | 2/1996 | Stricklin et al. | 360/106 |
| 5,530,606 A * | 6/1996 | Baasch et al. | 360/245.6 |
| 5,557,488 A | 9/1996 | Hamilton et al. | 360/104 |
| 5,606,477 A | 2/1997 | Erpelding et al. | 360/104 |
| 5,757,580 A | 5/1998 | Andress et al. | 360/97.02 |
| 5,771,135 A | 6/1998 | Ruiz et al. | 360/104 |
| 5,796,553 A | 8/1998 | Tangren | 360/104 |
| 5,825,590 A * | 10/1998 | Ohwe | 360/244.8 |
| 5,936,799 A * | 8/1999 | Kuratomi | 360/97.03 |
| 5,943,191 A | 8/1999 | Giere et al. | 360/104 |
| 6,005,750 A * | 12/1999 | Willard et al. | 360/244.8 |
| 6,091,574 A | 7/2000 | Misso | 360/104 |
| 6,728,073 B1 * | 4/2004 | Budde et al. | 360/245.9 |

FOREIGN PATENT DOCUMENTS

| | | | | | |
|---|---|---|---|---|---|
| JP | 61204876 A | * | 9/1986 | | G11B/21/20 |
| JP | 63302483 A | * | 12/1988 | | G11B/21/20 |
| JP | 02046577 A | * | 2/1990 | | G11B/21/20 |
| JP | 02143945 A | * | 6/1990 | | G11B/17/32 |
| JP | 02177169 A | * | 7/1990 | | G11B/17/32 |
| JP | 05020825 A | * | 1/1993 | | G11B/21/21 |
| JP | 06333319 A | * | 12/1994 | | G11B/17/32 |
| JP | 11191261 A | * | 7/1999 | | G11B/17/32 |
| JP | 11259955 A | * | 9/1999 | | G11B/17/32 |

* cited by examiner

Primary Examiner—William J Klimowicz
(74) Attorney, Agent, or Firm—Westman, Champlin & Kelly, P.A.

(57) ABSTRACT

A gimbal assembly to dampen air bearing vibration to reduce interference with read-write operations. The gimbal assembly includes dampeners on coextending gimbal arms gimbally supporting an air bearing slider to dampen vibration of the air bearing slider excited by air bearing vibration modes.

20 Claims, 8 Drawing Sheets

HEAD GIMBAL ASSEMBLY INCLUDING DAMPENING FOR AIR BEARING VIBRATION

CROSS-REFERENCE TO RELATED APPLICATION

This application claims priority from U.S. Provisional Application Ser. No. 60/304,237 filed on Jul. 10, 2001 entitled "HEAD GIMBAL ASSEMBLY WITH INCREASED AIR BEARING DAMPING".

FIELD OF THE INVENTION

The present invention relates generally to data storage devices, and more particularly but not by limitation to a head gimbal assembly for data storage devices.

BACKGROUND OF THE INVENTION

Data storage devices store digital information on a disc or storage media. Heads read data from or write data to the data storage disc. Heads include transducer elements, such as inductive, magneto-resistive and magneto-optical transducer elements for read-write operations. Heads are coupled to an actuator assembly via a head suspension assembly and the actuator assembly is energized to position the heads relative to selected data tracks for read-write operations. The head suspension assembly includes a load beam which supplies a load force to the head at a load or gimbal point. The head is coupled to the suspension assembly or load beam through a gimbal assembly so that the head pitch and rolls relative to the load or gimbal point to follow the contour of the disc or data storage surface.

Transducer elements of the head are carried on an air bearing slider for proximity or near proximity recording. The air bearing slider includes at least one raised bearing surface and at least one recessed bearing surface. Rotation of the disc or storage medium provides an air flow along the air bearing surface of the slider to provide an aerodynamic lifting force which is countered by the load force to define in part a fly height for the slider for read-write operations.

Areal disc drive density is increasing demanding increased fly height control or control of head-disc spacing between the transducer elements carried by the slider and the disc surface. Vibration of the head or slider can increase off-track motion and degrade head disc spacing parameters and read-write resolution and clarity. Vibration of the head can be introduced via vibration of the suspension assembly as a result of turbulent air flow along the suspension or through operation of the actuator assembly for track positioning. Prior suspension structures include damping features to dampen vibration of the suspension or load beam to reduce or dampen vibration of the suspension vibration modes which interferes with read-write operations.

The contour or waviness of the disc surface can affect air bearing pressurization exciting vibration of air bearing resonance or vibration modes which can degrade read-write resolution or clarity. Air bearing vibration can also be excited by contact with particles on the disc surface or contact with an asperity on the disc surface. Excitation of air bearing resonance or vibration modes can degrade read-write operations or damage the head or disc surface. Embodiments of the present invention provide solutions to these and other problems, and offer other advantages over the prior art.

SUMMARY OF THE INVENTION

The present invention relates to a gimbal assembly to dampen air bearing vibration. The gimbal assembly includes dampeners on coextending gimbal arms gimbally supporting an air bearing slider to dampen vibration of the air bearing slider excited by air bearing vibration modes. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
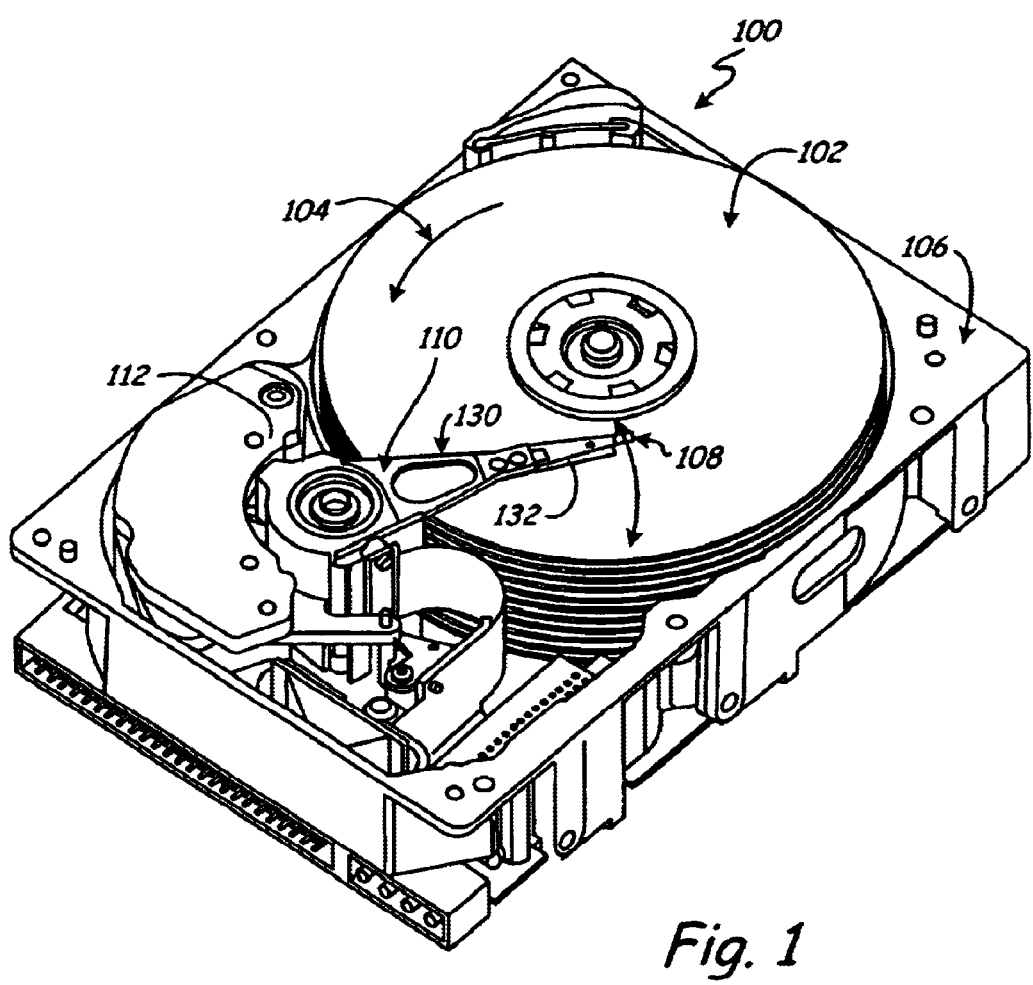
FIG. 1 is a perspective illustration of a data storage device.

FIG. 1 is a perspective illustration of an embodiment of a data storage device 100 in which embodiments of the present invention are useful. Device 100 includes at least one disc or storage media 102 rotationally (as illustrated by arrow 104) coupled to a base chassis 106 by a spindle motor (not shown). Heads 108 are coupled to an actuator assembly 110 as shown. A voice coil motor 112 is coupled to the actuator assembly 110 and is operational to position the heads 108 relative to selected data tracks on the disc surface for read-write operation through interface with a host system (not shown).

Figure 2:
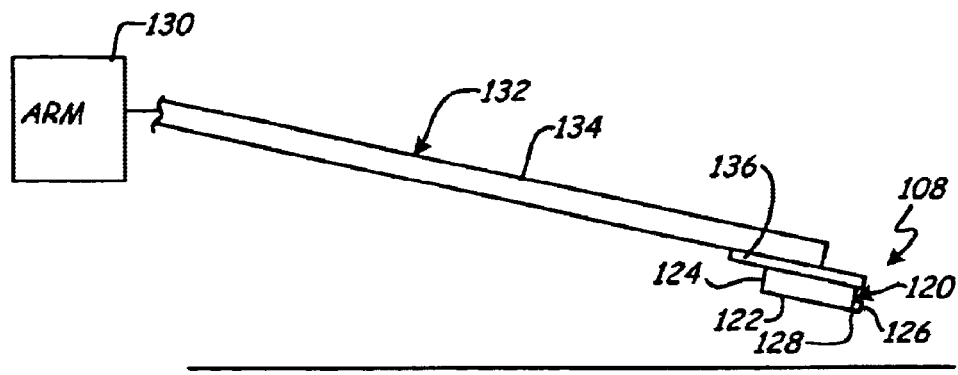
FIG. 2 is a schematic elevation illustration of a head suspension assembly.

As shown in FIG. 2, the head 108 includes a slider 120 having an air bearing surface 122, a leading edge 124 and a trailing edge 126. Rotation of the disc provides an air flow along the air bearing surface 122 of the slider from the leading edge 124 to the trailing edge 126 for aerodynamic operation. In the illustrated embodiment, transducer elements 128 (illustrated schematically) are fabricated proximate to the trailing edge 126 of the slider 120. Transducer elements include, but are not limited to inductive, magneto-resistive, tunneling magneto-resistive and magneto-optical transducer elements.

Figure 3:
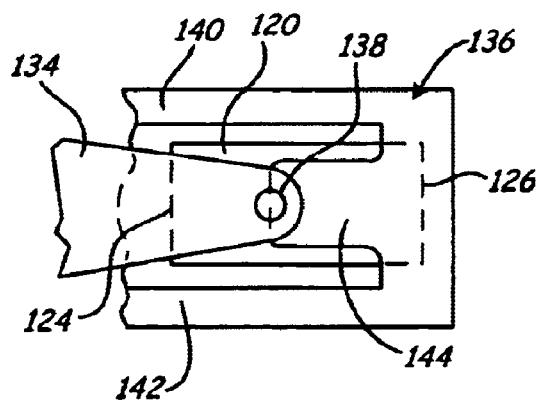
FIG. 3 is a detail illustration of gimbal arms of a head gimbal assembly including a slider coupled thereto.

As illustrated schematically, heads 108 are coupled to an actuator arm 130 of the actuator assembly 110 through a head suspension assembly 132 including a suspension arm or load beam 134 and a gimbal spring 136. As shown in FIG. 3, the load beam 134 is adapted to supply a load force at a load or gimbal point 138 to the head or slider 120 which is opposed to the aerodynamic lifting force of the air bearing surface 122 of the slider to define in part a fly height for the slider above the disc surface. As shown in FIG. 3, the gimbal spring 136 includes opposed spaced elongated coextending gimbal arms 140, 142 having a cantilevered length extending along a length of the slider between the leading and trailing edges 124, 126 of the slider. The slider is coupled to a slider-gimbal interface 144 gimbally supported by the gimbal arms 140, 142 to allow the slider to pitch and roll relative to the load or gimbal point 138 to follow the contour of the disc surface for read-write operations.

Figure 4:
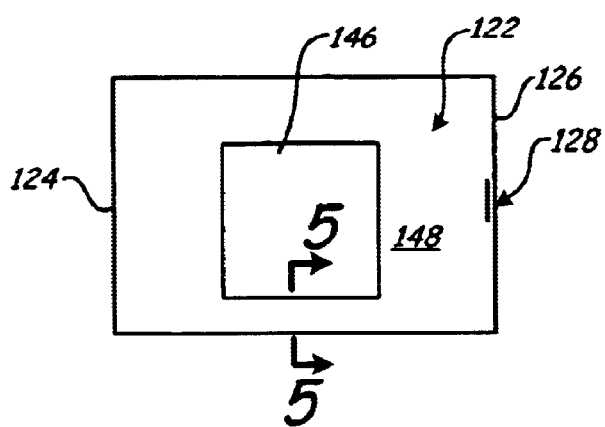
FIGS. 4–5 schematically illustrate an air bearing slider including at least one raised bearing surface and at least one recessed bearing surface.
Figure 5:
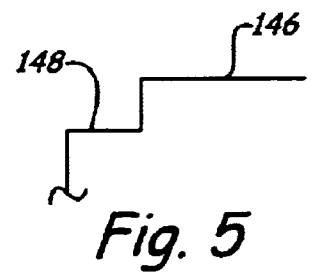
Figure 6:
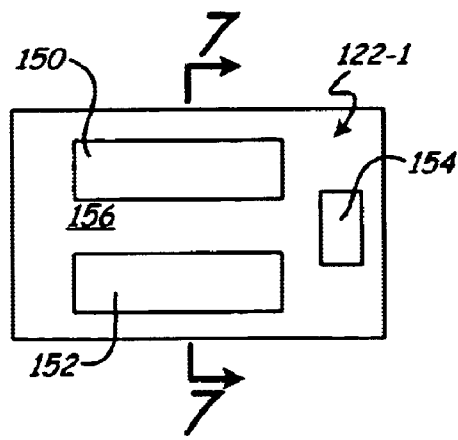
FIGS. 6–7 schematically illustrate an air bearing slider including opposed side rails and a center pad.
Figure 7:
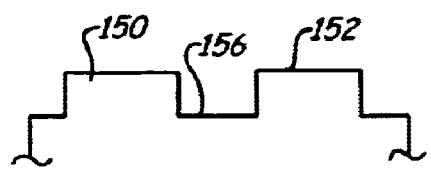

As schematically illustrated in FIGS. 4–5, the air bearing surface 122 of the slider 110 includes at least one raised bearing surface 146 and at least one recessed bearing surface 148. FIGS. 6–7 cooperatively illustrate an embodiment of an air bearing surface 122-1 including raised bearing rails 150, 152 and a raised center pad 154 defining raised bearing surfaces elevated above a recessed bearing surface 156. Although the FIGS. illustrate particular air bearing designs, application of the present invention is not limited to the particular air bearing designs shown. For example, known air bearing designs include two rail sliders or alternate bearing designs. Pressurization of the air flow along the air bearing surface between the air bearing surface and the disc surface provides the aerodynamic lifting force as previously described.

Pressurization or a pressure profile along the air bearing surface 122 or 122-1 of the slider 120 varies relative to the contour or waviness of the disc surface since variations in the contour introduce variations in the spacing between the air bearing surface and the disc surface. Variations in the pressure profile along the air bearing slider or contact with particles on the disc surface or contact with an asperity on the disc surface can excite air bearing vibration modes or resonance as illustrated by arrow 158 in FIG. 8. Vibration or resonance of the air bearing slider 120 interferes with read-write operations or can cause head slap or damage to the disc surface.

Figure 8:
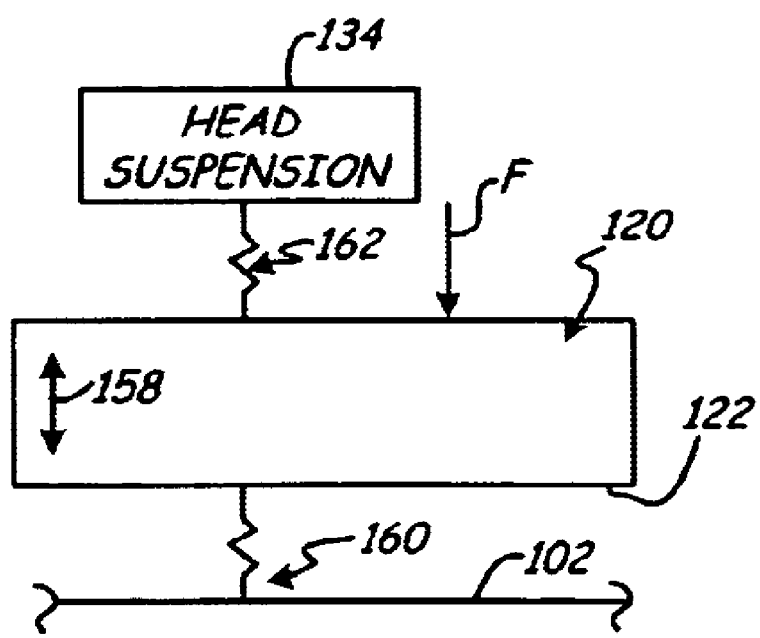
FIG. 8 is a diagrammatic illustration of a spring mass system for excitation of air bearing vibration modes.

Air bearing vibration excites a spring mass system illustrated schematically in FIG. 8, where the air bearing slider 120 forms the vibrating mass having opposed spring systems 160, 162 formed by the air bearing of the slider and disc surface and the gimbal arms or spring. Excitation of the mass or slider 120 coupled to the slider-gimbal interface 144 flexes the gimbal arms 140, 142 and provides a potential energy source and the air bearing spring 160 provide an opposed energy source for dynamic oscillation. The spring mass system controls dynamic oscillation and amplitude of the air bearing slider vibration. An underdamped or undamped system can increase vibration or air bearing resonance degrading read-write operations. Prior air bearing damping systems include air bearing designs to increase damping. The present invention relates to a damping system on the spring system 162 or gimbal arms to limit vibration amplitude and interference with read-write operations.

Figure 9:
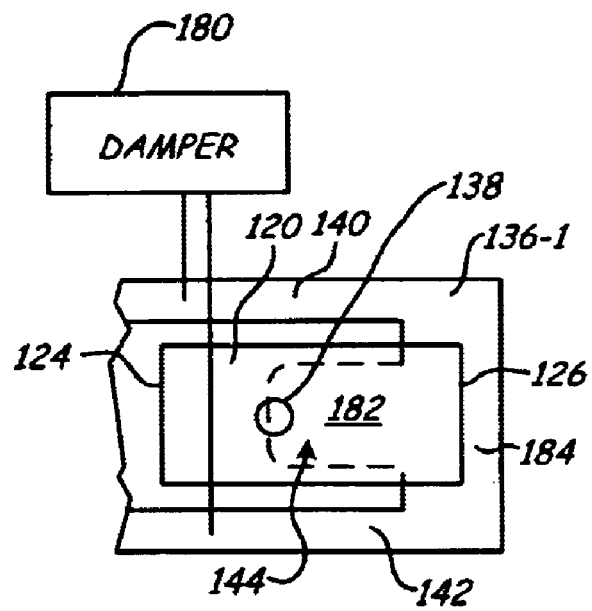
FIG. 9 illustrates an embodiment of gimbal arms of a head gimbal assembly including dampeners.

As schematically illustrated in FIG. 9, opposed gimbal arms 140, 142 of gimbal spring 136-1 include a dampener 180 as illustrated schematically to dissipate spring energy to attenuate air bearing vibration or excitation. The dampener 180 is designed to provide sufficient flexure to the gimbal arms gimbally supporting the slider 120 to allow the slider 120 to pitch and roll to follow the contour of the disc surface. For example, the dampener 180 is designed to increase torsional stiffness of the gimbal arms less than 1 μNm/degree. The dampener 180 also provides energy dissipation to dampen vibration excited by air bearing vibration modes. For example, dampeners 180 can be designed to reduce vibration amplitude by 50% compared to undamped gimbal arms. In the illustrated embodiment of FIG. 9, the slider-gimbal interface 144 includes a slider tab 182 gimbally supported by the gimbal arms through cross-beam 184 which extends between cantilevered ends of the gimbal arms 140, 142 to allow the slider to gimbal relative to the load or gimbal point 138.

Figure 10:
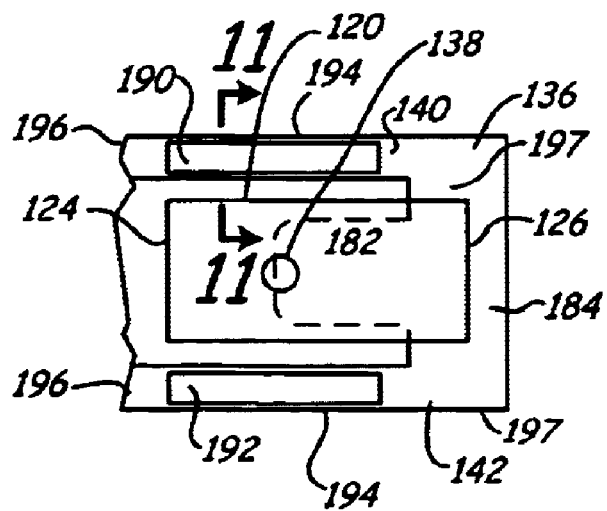
FIG. 10 illustrates an embodiment of gimbal arms of a head gimbal assembly including viscoelastic dampening strips or layers formed on the gimbal arms.
Figure 11:
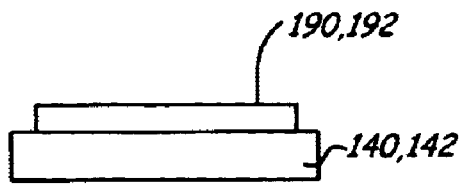
FIG. 11 is a cross-sectional view as taken along line 11—11 of FIG. 10 illustrating an embodiment of the damped gimbal arm structure of FIG. 10.

In an embodiment illustrated in FIGS. 10–11, dampener 180 includes viscoelastic damping layers or strips 190, 192 on the coextending gimbal arms 140, 142. In the illustrated embodiment, dampening layers or strips 190, 192 are formed of a viscoelastic material such as a Scotchdamp viscoelestic material available from 3M Corp. of Saint Paul, Minn. As shown in FIG. 11 the viscoelastic damping strips 190, 192 are formed on the gimbal arms which is formed of a stamped or etched stainless steel material. In one embodiment, the viscoelastic strips 190, 192 have a thickness dimension of approximately 0.001 inches.

Figure 12:
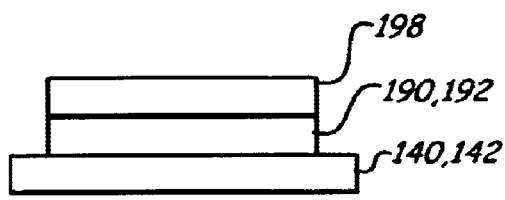
FIG. 12 schematically illustrates another embodiment of a damped gimbal arm structure including a constraining layer formed on a viscoelastic layer.

Excitation of air bearing vibration modes vibrates or flexes an intermediate portion 194 of the gimbal arms 140, 142. In the illustrated embodiment of FIG. 10, dampening layers 190, 192 are positioned along the intermediate portion 194 of the gimbal arms 140, 142 to dampen vibration and not along leading and trailing edge portions 196, 197 of the gimbal arms 140, 142 to limit interference with leading edge roll and trailing edge pitch of the slider, although application is not limited to the specific embodiment shown. The increased stiffness of the gimbal arms 140, 142 with the viscoelastic damping strip increases the assembled pitch torque and roll torque of the head. However, relaxation of the viscoelastic layer or strips 190, 192 reduces variations in the pitch and roll torque from a nominal pitch and roll torque In one embodiment illustrated in FIG. 12, the dampener 180 includes a viscoelastic layer or strip 190, 192 and a constraining layer or strip 198 formed on the viscoelastic layer or strip 190, 192. The constraining layer or strip 198 is formed of a polymer material such as polyimide or Mylar®, or a metal material such as stainless steel. In one embodiment the viscoelastic layer or strip 190, 192 and the constraining layer or strip 198 each have a thickness dimension of approximately 0.001 inches.

Figure 13:
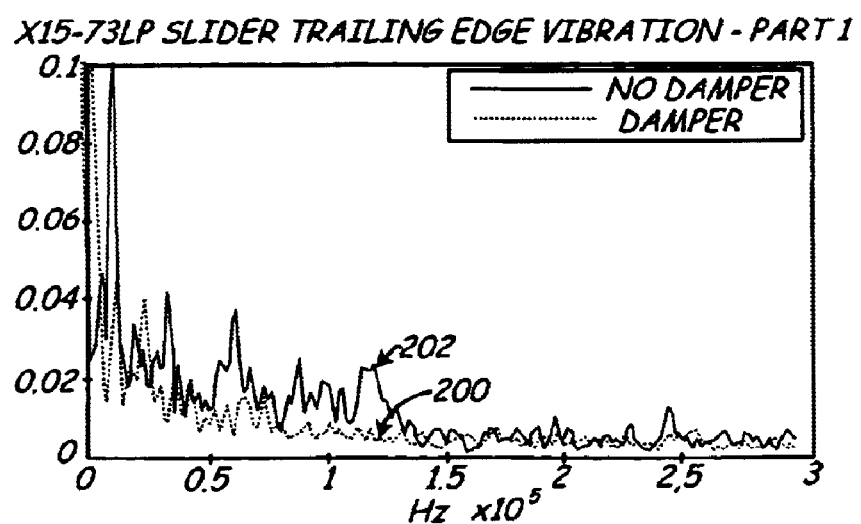
FIG. 13 is a graphical illustration of excitation of a trailing edge pitch air bearing vibration mode for a damped gimbal arm structure and an undamped gimbal arm structure.
Figure 14:
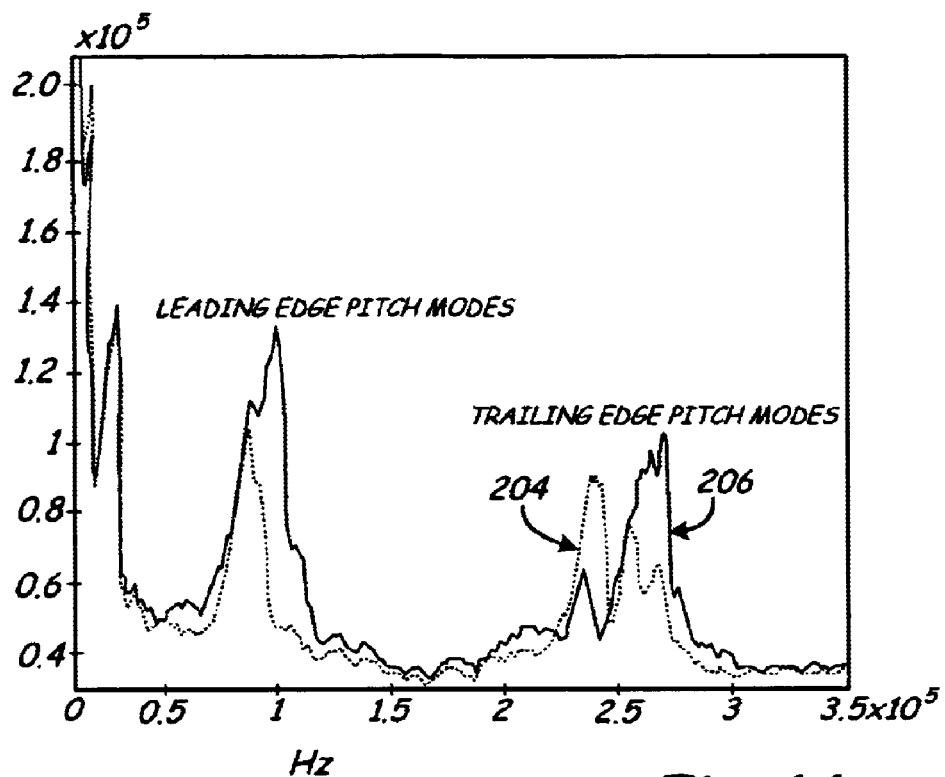
FIG. 14 is a graphical illustration of an air bearing vibration spectrum for a damped gimbal arm structure and an undamped gimbal arm structure.

Air bearing excitation modes are typically in 50–200 Hz frequency range and include a trailing edge vibration mode of the air bearing slider. As comparatively illustrated in FIG. 13, vibration amplitude of the trailing edge vibration mode is damped more rapidly for a spring having damped gimbal arms as illustrated by line 200 than the vibration amplitude for undamped gimbal arms as illustrated by line 202. FIG. 14 illustrate an air bearing vibration spectrum for different air bearing vibration modes. As shown vibration amplitude is lower for the damped gimbal assembly 204 than the undamped gimbal assembly 206 to optimize dynamic response.

Figure 15:
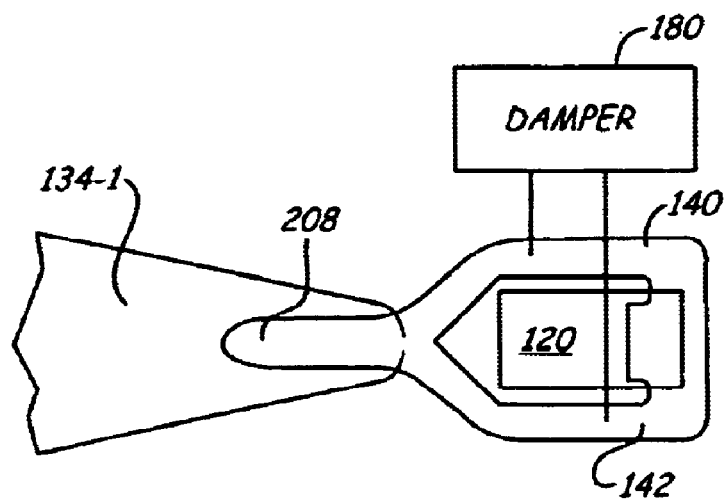
FIG. 15 illustrates an embodiment of a gimbal spring having damped gimbal arms attached to a suspension arm of a suspension assembly.
Figure 17:
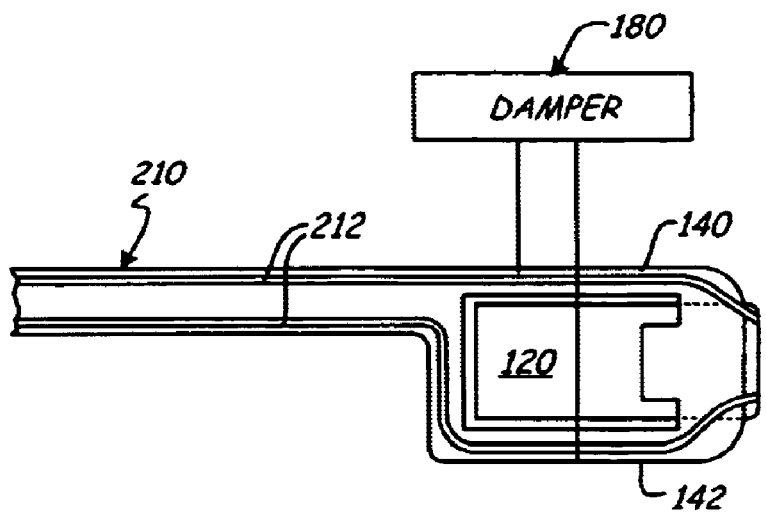
FIG. 17 illustrates an embodiment of an integrated flexible circuit-gimbal assembly having damped gimbal arms.
Figure 16:
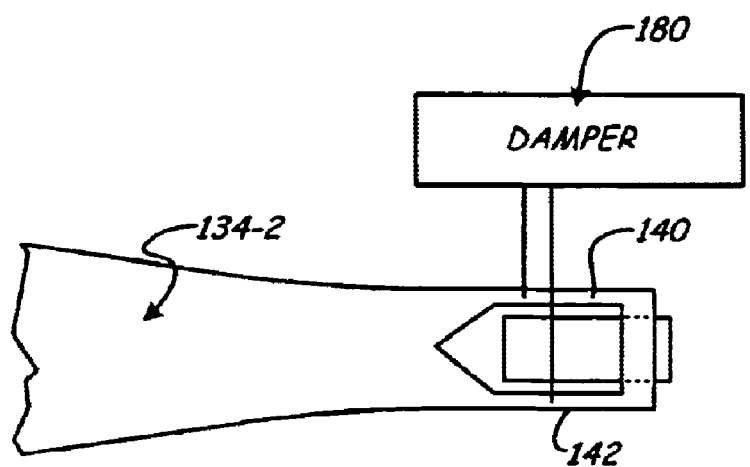
FIG. 16 illustrates an embodiment of an integral gimbal-suspension assembly having damped gimbal arms.

As shown in FIG. 15, the gimbal arms or gimbal spring can attach to a cantilevered end of a suspension arm 134-1 via a tongue 208 of the gimbal spring, or alternatively as shown in FIG. 16, the suspension arm 134-2 and gimbal arm or spring structure can be formed as a unitary structure. In another embodiment illustrated in FIG. 17, the gimbal arms 140, 142 are formed integral with a flexible circuit 210 having transducer leads 212 fabricated or printed therealong. Although particular embodiments of gimbal arms and springs are shown, application is not limited to the particular designs and shapes shown.

A gimbal assembly to dampen air bearing vibration to reduce interference with read-write operations. The gimbal assembly includes dampeners (such as 180) on coextending gimbal arms(such as 140, 142) gimbally supporting an air bearing slider (such as 120) to dampen vibration of the air bearing slider (such as 120) excited by air bearing vibration modes.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular data storage device it will be appreciated by those skilled in the art that the teachings of the present invention can be applied to other devices using gimbal structures, without departing from the scope and spirit of the present invention.

What is claimed is:

1. A head gimbal assembly comprising:
   slider including a slider body having a leading edge, a trailing edge and body length between the leading and trailing edges;
   a gimbal spring having opposed spaced coextending gimbal arms having an elongated length coextending with the body length of the slider; and
   separate spaced dampening strips formed on the opposed spaced coextending gimbal arms and the separate spaced dampening strips having a strip length aligned with the elongate length of the gimbal arms coextending with the body length of the slider.

2. The head gimbal assembly of claim 1 wherein the separate spaced dampening strips are formed of a viscoelastic material.

3. The head gimbal assembly of claim 2 and further comprising a constraining layer formed on the viscoelastic dampening strips.

4. The head gimbal assembly of claim 3 wherein the constraining layer is formed of a metal material.

5. The head gimbal assembly of claim 3 wherein the constraining layer is formed of a polymer material.

6. The head gimbal assembly of claim 2 wherein a dimension of the viscoelastic dampening strips optimizes gimbal flexure of the gimbal arms and dampening response for air bearing vibration modes.

7. The head gimbal assembly of claim 1 wherein the gimbal spring and the opposed spaced coextending gimbal arms are formed along a portion of a flexible circuit including a plurality of leads to electrically connect to a transducer elements carried by the slider.

8. The head gimbal assembly of claim 1 wherein the gimbal spring includes a tongue portion to attach to an end portion of a suspension arm.

9. The head gimbal assembly of claim 1 wherein the gimbal spring includes a slider tab extending from a cross beam coupled to ends of the coextending gimbal arms.

10. The head gimbal assembly of claim 1 wherein a load beam supplies a load force at a load point of the head gimbal assembly about which the slider pitches and rolls.

11. A head gimbal assembly comprising:
    a slider including a slider body having a leading edge, a trailing edge and a body length between the leading and trailing edges;
    a gimbal spring having opposed spaced coextending gimbal arms having an elongate length coextending with the body length of the slider; and
    a dampener formed on the spaced coextending gimbal arms and the dampener including a dampening layer and a constraining layer formed of a polymer material.

12. The head gimbal assembly of claim 11 wherein the gimbal spring includes a tongue to attach the gimbal spring to a suspension arm to form a head suspension assembly.

13. The head gimbal assembly of claim 11 wherein the gimbal spring includes a slider tab coupled to an end portion of the coextending gimbal arms.

14. The head gimbal assembly of claim 11 wherein the polymer constraining layer forms an outer layer and the dampening layer forms an inner layer on the gimbal arms.

15. The head gimbal assembly of claim 11 wherein a load beam supplies a load force at a load point of the head gimbal assembly about which the slider pitches and rolls.

16. A head gimbal assembly comprising:
    an air bearing slider including a leading edge, a trailing edge and body length between the leading edge and the trailing edge;
    a gimbal spring having a spring body including opposed spaced coextending gimbal arms having an elongate length coextending with the body length of the slider; and
    a dampener formed only on the gimbal arms of the spring body and having a length extending along the opposed spaced gimbal arms coextending along the body length of the slider.

17. The head gimbal assembly of claim 16 wherein the dampener includes a viscoelastic dampening layer formed on the opposed spaced gimbal arms.

18. The head gimbal assembly of claim 17 and further comprising a constraining layer formed on the viscoelastic dampening layer.

19. The head gimbal assembly of claim 18 wherein the constraining layer is approximately 0.001 inches thick.

20. The head gimbal assembly of claim 17 wherein the viscoelastic dampening layer extends only along an intermediate portion of the coextending gimbal arms.

* * * * *